US010861378B2

(12) United States Patent
Guo et al.

(10) Patent No.: US 10,861,378 B2
(45) Date of Patent: Dec. 8, 2020

(54) INTERACTIVE LED DISPLAY DEVICE AND DISPLAY METHOD THEREOF

(71) Applicant: SHENZHEN UNIVIEW LED CO., LTD., Shenzhen (CN)

(72) Inventors: Chang Guo, Guangdong (CN); Feng Qi, Guangdong (CN); Ming Liu, Guangdong (CN)

(73) Assignee: SHENZHEN UNIVIEW LED CO., LTD., Shenzhen (CN)

(*) Notice: Subject to any disclaimer, the term of this patent is extended or adjusted under 35 U.S.C. 154(b) by 60 days.

(21) Appl. No.: 16/236,638

(22) Filed: Dec. 31, 2018

(65) Prior Publication Data
US 2019/0139485 A1 May 9, 2019

Related U.S. Application Data

(63) Continuation-in-part of application No. PCT/CN2017/076686, filed on Mar. 15, 2017.

(30) Foreign Application Priority Data

Oct. 12, 2016 (CN) .......................... 2016 1 0891170

(51) Int. Cl.
G09G 3/32 (2016.01)
G06F 3/14 (2006.01)
G06F 3/041 (2006.01)

(52) U.S. Cl.
CPC .............. G09G 3/32 (2013.01); G06F 3/041 (2013.01); G06F 3/1446 (2013.01);
(Continued)

(58) Field of Classification Search
CPC .. G06F 3/1446; G06F 3/041; G09G 2300/026
See application file for complete search history.

(56) References Cited

U.S. PATENT DOCUMENTS

2006/0044149 A1* 3/2006 Blum ................. G06Q 30/0603
340/687
2008/0048880 A1* 2/2008 Strickland ............... G09F 19/22
340/815.4
(Continued)

FOREIGN PATENT DOCUMENTS

CN 102265252 A 11/2011
CN 105426166 A 3/2016

OTHER PUBLICATIONS

International Search Report of PCT Patent Application No. PCT/CN2017/076686 dated Jul. 18, 2017.

Primary Examiner — Sepehr Azari

(57) ABSTRACT

The present invention relates to an interactive LED display device which comprises a control terminal, a plurality of unit information acquisition systems, a plurality of LED modules, a plurality of interactive sensors and interactive effective induction systems. The control terminal is connected to the plurality of unit information acquisition systems. Each unit information acquisition system is connected to the plurality of LED modules. Each LED module is connected to the plurality of interactive effective induction systems. Each effective induction system is connected to one or more interactive sensors. The present invention also relates to a display method of an interactive LED display device. The LED display device and the display method have a preferred adaptability to serious circumstance, an enhanced stability of interactive display and bring out strengthened interactive display effect.

18 Claims, 7 Drawing Sheets

(52) U.S. Cl.
CPC . *G09G 2300/026* (2013.01); *G09G 2330/027* (2013.01); *G09G 2354/00* (2013.01); *G09G 2370/04* (2013.01)

(56) References Cited

U.S. PATENT DOCUMENTS

| | | | | |
|---|---|---|---|---|
| 2011/0080350 | A1* | 4/2011 | Almalki | G06F 3/0416 |
| | | | | 345/173 |
| 2014/0160081 | A1* | 6/2014 | Jansson | G06F 3/0425 |
| | | | | 345/175 |
| 2015/0062022 | A1* | 3/2015 | Rabii | G06T 1/20 |
| | | | | 345/173 |
| 2016/0019019 | A1* | 1/2016 | Ikeda | G06F 3/1446 |
| | | | | 345/173 |
| 2016/0372083 | A1* | 12/2016 | Taite | G06F 3/017 |
| 2017/0344171 | A1* | 11/2017 | Qiao | G06F 3/1446 |
| 2019/0025139 | A1* | 1/2019 | Morita | G06F 3/0414 |

\* cited by examiner

INTERACTIVE LED DISPLAY DEVICE AND DISPLAY METHOD THEREOF

CROSS REFERENCE TO RELATED APPLICATIONS

The present application is a Continuation-In-Part Application of PCT Application No. PCT/CN2017/076686 filed on Mar. 15, 2017, which claims the benefit of Chinese Patent Application No. 201610891170.2 filed on Oct. 12, 2016. All the above are hereby incorporated by reference.

TECHNICAL FIELD

The present invention relates to LED display technical field and, more particularly to an interactive LED display device and a display method thereof.

BACKGROUND

In present, a variety of enterprises in LED display screen field make great efforts to innovation for achieving differentiation of their own products, in order to obtain competitive dominant position, and thus breaking serious homogenization status of similar products in the market.

In early stage, interactive displays are prevalently occurred as commerce ornaments with a function merely to display simple image under the control of a microcontroller embodied therein or a computer connected thereto. So, the entire screen displays static pictures stored in the microcontroller or computer. However, the pictures or displaying results are predefined in microcontroller or computer, are output in accordance with preset programs and cannot be altered with respect to circumstance change, as well as no interactive action with people.

Subsequently, interactive technology of the display screen undoubtedly becomes one of the most practicability and widely perspective display technologies in the LED display screen field. Interactive display screens provide a high efficiency approach to stage exhibits, commerce ornaments and human-computer interaction, are beneficial complements for current stage display devices, and give a relatively perspective development tendency for LED display screen manufacturers.

Although traditional LED display screens can also achieve similar interactive effect by presetting video, displaying actions (e.g., exhibits or performances) may be affected by some uncertain factors. In this situation, specialists are demanded for timely adjusting the video in the present. This wastes manpower and material resources, has deferred and inaccurate shortages caused by manual adjustment to the display effect, and brings out undesired display effect. On the contrary, the interactive LED display screens can promptly conduct a pertinence acquisition of all the interactive actions in the scene and achieve corresponding display feedbacks (e.g., multimedia feedbacks with audio and video).

Prior interactive LED display screens pay attentions to particular designs on hardware characteristics such as outside load, shield, anti-fog, heat radiation, and so on, in order to adapt high weighty trample, long-term operation and reduce maintenance. However, these screens are absent in stability and circumstance compatibility when conduct interactive sense with human bodies. Further, the sensors used may be affected by variation of external circumstance. When the sensors are located in high temperature and humidity conditions or surfaces of the display screens are interfered by something (dust, water or other blocks existed on the surfaces the interactive display), interactive detective properties may be decreased and even spurious triggering or failure triggering may be generated, thereby producing a serious influence on interactive display effect.

SUMMARY OF THE INVENTION

Therefore, an interactive LED display device is provided, which achieves sensor information communication between interactive effective induction systems and information acquisition systems, as well as between information acquisition systems and a control terminal. Thus, the interactive LED display device has a preferred adaptability to serious circumstance and an enhanced stability.

In order to achieve the above object, an interactive LED display device is provided, which comprises a control terminal, a plurality of unit information acquisition systems, a plurality of LED modules, a plurality of interactive sensors and interactive effective induction systems. The control terminal being connected to the plurality of unit information acquisition systems. Each unit information acquisition system is connected to the plurality of LED modules. Each LED module is connected to the plurality of interactive effective induction systems. Each interactive effective induction system is connected to one or more interactive sensors.

In a preferred embodiment, the interactive sensors are physical sensors which are weight sensors or capacitance sensors. In another preferred embodiment, the control terminal is a computer. The unit information acquisition systems are preferably micro controller units.

The interactive effective induction systems (keep in an interactive detection status in operation) detect induction values of the interactive sensors, and at the same time determine whether currently formed induction values are in an interactive effective status or not, and then arrange their own output status according to current status. Further, the interactive effective induction systems have a preferred compatibility to serious circumstance and a structural adaptability with respect to casing. The compatibility to serious circumstance includes high temperature adaptability, high humidity adaptability, high luminance adaptability and interactive effective adaptability without manual operation. The unit information acquisition systems pick up every interactive effective output status from respective interactive effective induction systems carried in unit information acquisition systems and analyze these output statuses to be interactive effective data. Moreover, the device has a multi-passage information acquisition and a multi-channel communication function. Meanwhile, the computer control terminal acquires all interactive effective data from all the unit information acquisition systems in real time. Host interactive control software controls display scenes of the LED screens according to these data so as to achieve an interactive function and a high quality interactive effect.

In another aspect of the present invention, a display method of the interactive LED display device is provided. The display method is implemented in the interactive LED display device to achieve sensor information communication between interactive effective induction systems and information acquisition systems, as well as between information acquisition systems and a control terminal. As such, the interactive effective induction systems are able to exactly pick up interactive effective status even though the induction values of the sensors are varied, thereby eliminating undesirable influence to interactive induction due to variation of external circumstance.

In order to achieve the above object, a display method of the interactive LED display device is provided. The display method comprises the following steps:

Step 001, constructing a plurality of interactive sensors;

Step 002, transferring induction values to the interactive effective induction systems by the interactive sensors;

Step 003, the interactive effective induction systems determining whether the currently received induction values are interactive effective status or not;

Step 004, providing corresponding output status by the interactive effective induction systems;

Step 005, the unit information acquisition systems acquiring the status of the interactive effective induction systems and storing data in their own memories;

Step 006, the control terminal reading interactive effective data of LED display screens from all the unit information acquisition systems; and Step 007, the control terminal controlling displaying of scenes according to the interactive effective data.

In a preferred embodiment, operation of the interactive effective induction systems comprises the following steps:

Step 200, power on the interactive effective induction systems and operating the interactive effective induction systems;

Step 201, the interactive effective induction systems performing initialization according to predetermined programs and pre-configuring operation parameters comprising interactive effective thresholds (i.e., triggering thresholds), noise thresholds and filtration means;

Step 202, the interactive effective induction systems updating induction basis values of the interactive effective thresholds according to induction values of the interactive sensors;

Step 204, the interactive effective induction systems detecting and reading the induction values of the interactive sensors;

Step 206, determining whether any interactive effective action is existed or not by comparing read induction values relative to interactive effective thresholds, if not, performing step 203 and then performing step 202; if yes, performing step 207;

Step 203, pre-configuring the output status to be non-touch status;

Step 207, configuring the output status to be touch status and the interactive effective induction systems starting up timers; and Step 205, determining whether the touch status is over-time or not, if not, back to step 204; if yes, back to step 202.

In a preferred embodiment, the operation of the unit information acquisition systems comprises the following steps:

Step 300, power on the unit information acquisition systems 101 and operating the unit information acquisition systems;

Step 301, the unit information acquisition systems performing initialization according to their own pre-configured programs and distributing output acquisition interrupts for the interactive effective induction systems and arranging respective communication passages according to current demands;

Step 302, the unit information acquisition systems getting into static power down mode and waiting for interrupt wake-up after accomplishing the arrangement of the interrupts;

Step 303, if any output status of the interactive effective induction systems is changed, the unit information acquisition systems capture the changed output status and triggering respective interrupts;

Step 304, the unit information acquisition systems separately acquiring every interactive effective output status from respective interactive effective induction systems carried in their own;

Step 305, the unit information acquisition systems integrating acquired status data and stored in the memories, and then getting into static power down mode;

Step 306, if the control terminal transmits communication request to the unit information acquisition systems, the unit information acquisition systems get into communication interrupt; and Step 307, the unit information acquisition systems reporting address data having interactive effective information to the control terminal according to address information incorporated in communication data, if any other interrupt responses are not occurred after the report, the unit information acquisition systems get into static power down mode and wait for next interrupt wake-up.

Preferably, the operation of the control terminal comprises the following steps:

Step 400, the control terminal starts up programs;

Step 401, pre-configuring parameters with respect to communication and parameters with respect to display scene according to given programs, and arranging timers for transmitting communication requests;

Step 402, the desired display scene being transmitted to the LED modules for displaying the desired scene;

Step 403, waiting for that the timers for transmitting communication requests are up;

Step 404, if one respective timer is up, the control terminal transmits corresponding communication request and waits for receiving report data from corresponding unit information acquisition system; and Step 405, if the report data from the unit information acquisition system is successfully received, the control terminal analyses effective data and picks up data segments related to the interactive effective induction, changes or remains the scene parameters according to the date and preset control programs, and then back to step 402 to control displaying of the scene after accomplishing the arrangement of scene parameters.

More preferably, the transmission of the desired display scene in step 402 is performed through the control terminal to a transmitting card, then to LED units, finally to LED modules.

The terms mentioned in the context of the present invention are explained as follows.

Interactive effective means an event that touch or access to LED modules with the interactive sensors by introduced detectable objects (e.g., human body or objects with certain resistance) trigger the sensors so as to cause the interactive effective induction systems to output interactive effective signals. An interactive effective status is namely a triggering status.

Spurious triggering means an event that neither touch nor access to LED modules with the interactive sensors is induced by introduced detectable objects (e.g., human body or objects with certain resistance), but the sensors are triggered so as to cause the interactive effective induction systems to output interactive effective signals. For example, the spurious triggering includes triggering of the interactive effective induction systems induced by variation of circumstance temperature or drip of water onto the interactive effective panels, thus generating signals.

Interactive effective threshold means an induction value from the interactive sensors which is able to effectively cause the interactive effective induction systems to output interactive effective signals, is also called as a triggering threshold.

Noise threshold means an induction value from the interactive sensors in a spurious triggering situation which is not enough to cause the interactive effective induction systems to output interactive effective signals.

Induction basis value means an induction value generated from the interactive sensor depending on variation of external circumstance without any triggering.

Failure triggering means an event that touch or access to LED modules with the interactive sensors by introduced detectable objects (e.g., human body or objects with certain resistance) are failure to trigger the sensors so that it is failure to cause the interactive effective induction systems to output interactive effective signals.

DETAILED DESCRIPTION OF THE INVENTION

The foregoing and other exemplary purposes, aspects and advantages of the present invention will be better understood in principle from the following detailed description of one or more exemplary embodiments of the invention with reference to the embodiment(s) and accompanied drawings. It is understood to one skilled in the art that the following description with reference to the embodiment(s) and accompanied drawings is merely to explain concepts and principals of the present invention but should not be seemed as limitation to the scope of the present invention.

Figure 1:
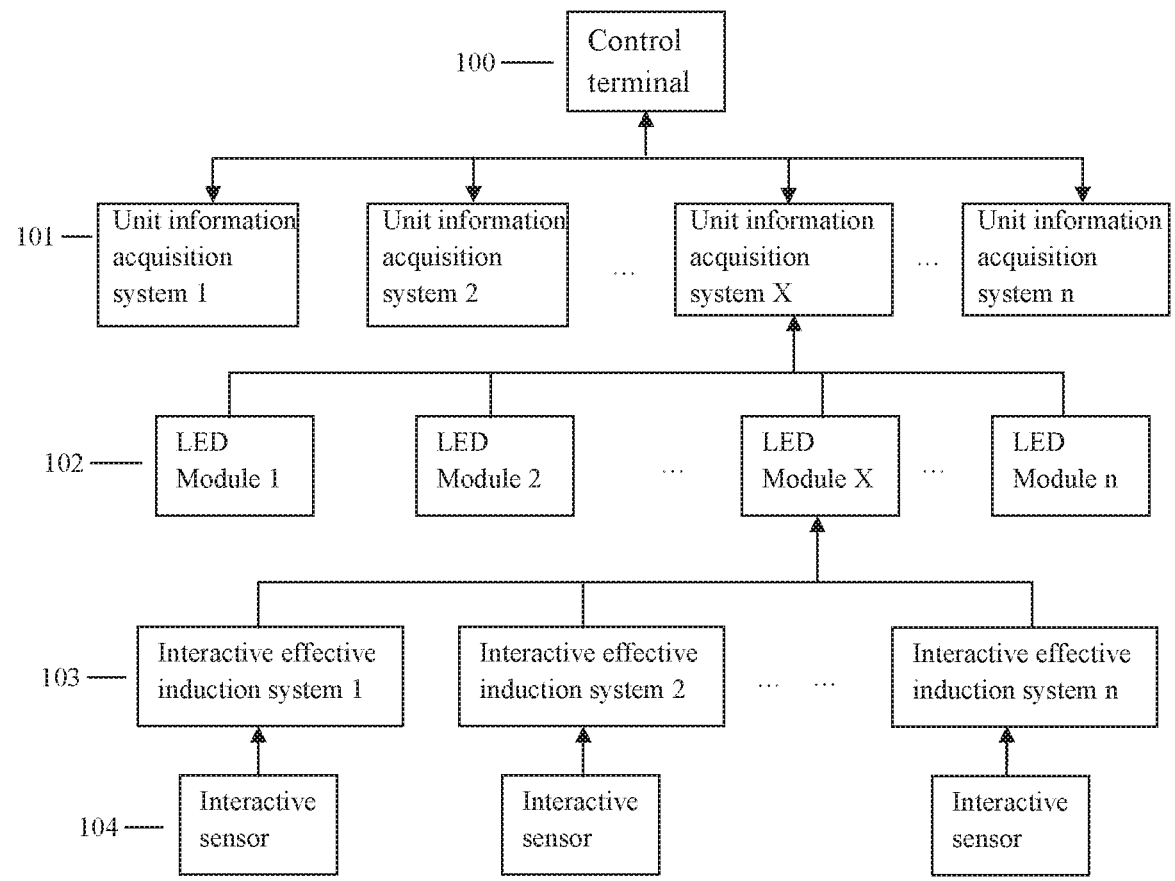
FIG. 1 illustrates a structure of an interactive LED display device according to an embodiment of the present invention.

Please referring to FIG. 1, in accordance with an embodiment of the present invention, an interactive LED display device is shown. The interactive LED display device comprises a control terminal 100, a plurality of unit information acquisition systems 101, a plurality of LED modules 102, a plurality of interactive sensors 104 and interactive effective induction systems 103. The control terminal 100 being connected to the plurality of unit information acquisition systems 101. Each unit information acquisition system 101 is connected to the plurality of LED modules 102. Each LED module 102 is connected to the plurality of interactive effective induction systems 103. Each interactive effective induction system is connected to one interactive sensor 104. In another embodiment, each interactive effective induction system is connected to more interactive sensors 104 depending on practical requirement.

In a preferred embodiment, the interactive sensors 104 are physical sensors which are not limited to be weight sensors or capacitance sensors.

In another preferred embodiment, the control terminal 100 is a computer. The unit information acquisition systems 101 are preferably micro controller units.

In this embodiment, the number of the unit information acquisition systems 101, the LED modules 102, the interactive sensors 104 and the interactive effective induction systems 103 are plurality and are in conformance with a preset proportion therebetween. For example, the number of the LED modules 102 is in proportion to the number of the interactive sensors 104, e.g., one to one, one to two or more. The number of the interactive effective induction systems 103 is in proportion to the number of the interactive sensors 104, e.g., one to one, one to two or more. The number of the unit information acquisition systems 101 is in proportion to the number of the LED modules 102, e.g., one to one, one to two or more.

Figure 6:
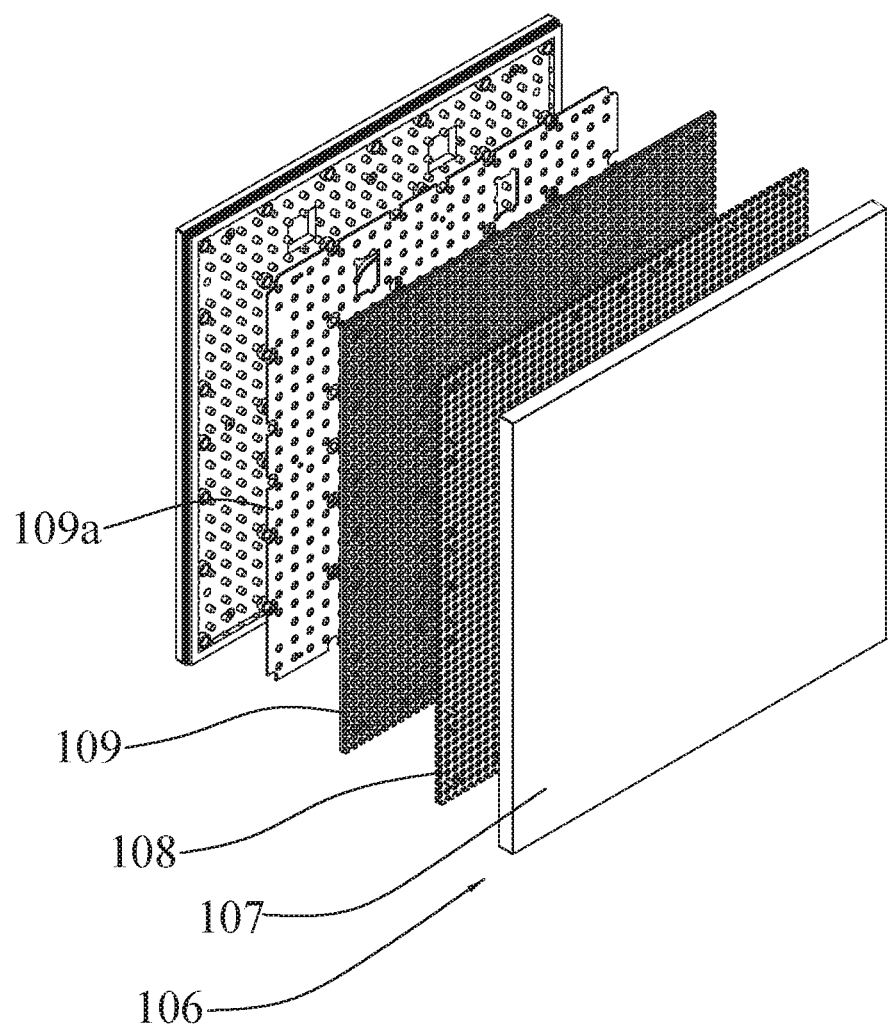
FIG. 6 is exploded view showing a LED display unit with a display screen, an interactive effective PCB board and a LED fixation plate in the interactive LED display device according to the embodiment of the present invention.
Figure 7:
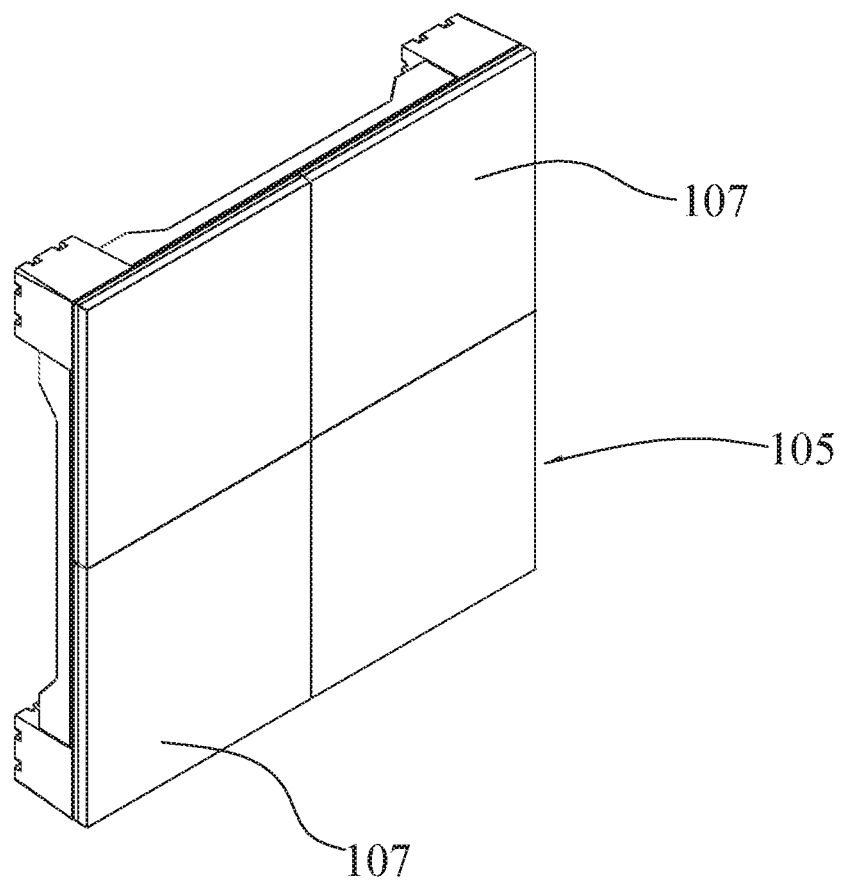
FIG. 7 is a schematic perspective view of an interactive LED display device according to the embodiment of the present invention.

Preferably, the LED modules 102 are configured to be a plurality of LED display units 106. As shown in FIGS. 6 and 7, all the LED display units 106 construct a main LED display screen 105, for displaying a continuous and motion main scene. Each LED display unit 106 is equipped with one or more interactive sensors 104. Each interactive sensor 104 is separately connected to one or more interactive effective induction systems 103. Each LED display unit 106 is equipped with a display screen 107. All the display screens 107 are matched together with one another, e.g. side by side, thereby forming the main LED display screen 105. The display screens 107 are arranged in an array form, e.g., 2*2, 4*4, 9*16, 12*18, etc. Each LED display screen 107 is equipped with one or more interactive sensors 104, for example attached to a rear surface of the LED display screen 107. An interactive effective PCB board 108 is attached to one respective LED display screen 107, and thus the interactive effective induction system 103 is arranged in the interactive effective PCB board 108. An LED fixation plate 109 is attached to one interactive effective PCB board 108, and thus the LED module 104 is arranged in the LED fixation plate 109. A heat irradiation element 190a is attached to the LED fixation plate 109 for heat spread. A back plate is disposed rear of the heat irradiation element 190a and is fixed to the display screen 107.

Preferably, each LED display unit 106 is connected to the control terminal 100 so that the control terminal 100 is able to control the displaying operation of every LED display unit 106 depending on data acquired by the unit information acquisition systems 101. Then, each LED display unit 106 separately shows its own divided scene in respective LED display screen. The control terminal 100 distributes all the divided scenes to the LED display units 106 and controls the LED display units 106 to display according to preset or given distribution of the divided scenes, which constitute the continuous and motion main scene shown in the main LED display screen. Further, a plurality of timers is provided to be cooperative with transmittance of communication requests. Specifically, if one respective timer is up, the control terminal transmits corresponding communication request and waits for receiving report data from corresponding unit information acquisition system.

In each LED display unit 106, each display screen 107 includes a display panel. One or more interactive induction films are provided to attach the display panel. The interactive induction films are preferably copper films or copper foil. Each interactive sensor includes a sensor IC which is connected with one respective interactive induction film. The interactive induction films are configured to actively and immediately monitor their own stress at any time and to generate a pressure variation when they are pressed from outer force to generate a pressure variation when they are pressed from outer force. For example, when a user is stepping on one display panel, the copper films or copper foil will be subjected to an external pressure from user's foot (feet) and this pressure variation is transferred to the sensor IC, thereby triggering an interactive effective signal. Preferably, the sensor IC is disposed on the interactive effective PCB board.

An arrow shown in FIG. 1 indicates a communication direction in accordance with this embodiment.

In operation, the interactive sensors 104 are kept in an interactive detection status and timely transfer induction values detected by their own to the interactive effective induction systems 103. The interactive effective induction systems 103 determine whether currently formed induction values are in an interactive effective status or not, and then arrange their own output status according to current status. If any output status of the interactive effective induction systems 103 is changed, the unit information acquisition systems 101 capture the changed output status and enter into acquisition interrupts. During the interrupt period, the unit information acquisition systems 101 acquires all the output status of the interactive effective induction systems 103 equipped within the respective unit information acquisition systems 101 and stores data in their own memories, then wait for communication interrupt emitted from the control terminal 100. In this situation, the control terminal 100 acts as a final step of data acquisition and is configured to collect all the interactive effective data with respect to the LED display screens 107 stored in the unit information acquisition systems 101. As such, the control terminal 100 controls the display of the LED modules according to these data, thereby achieving an interactive function.

Figure 2:
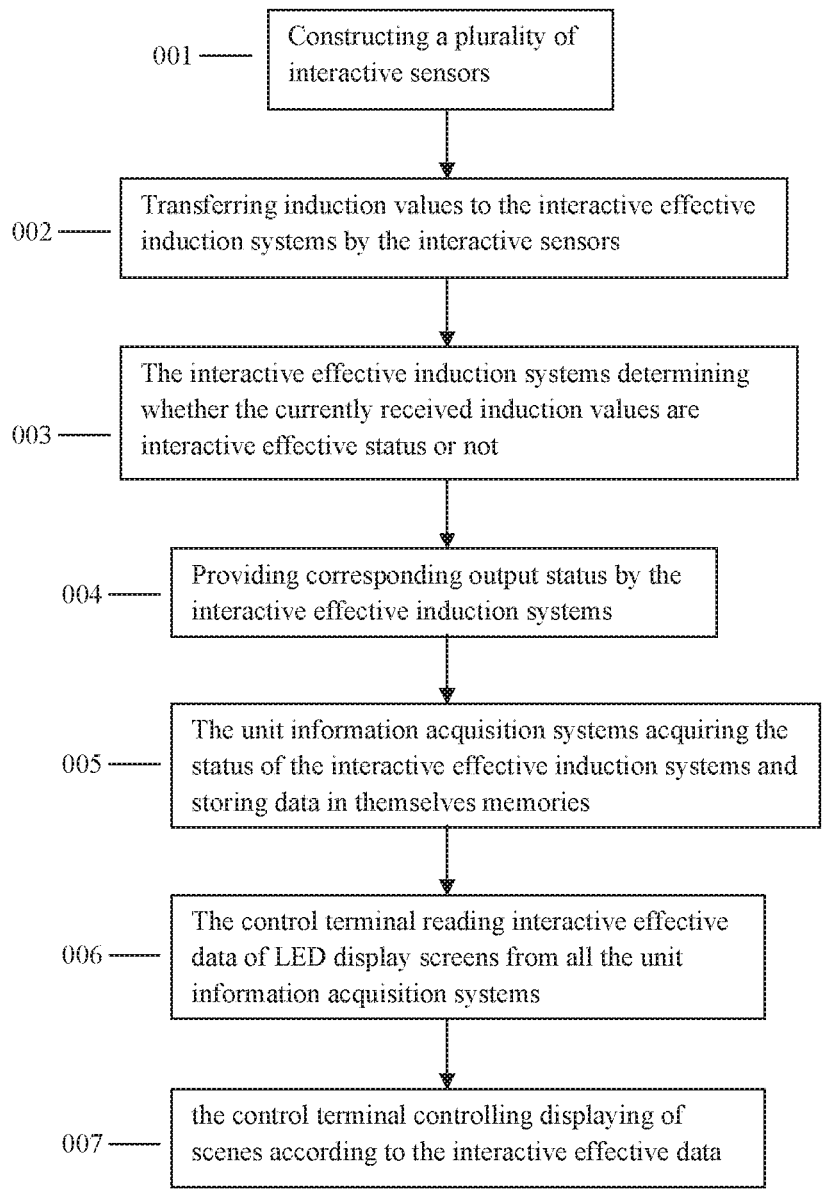
FIG. 2 illustrates an operation flow of the interactive LED display device according to the embodiment of the present invention.

In another aspect of the present invention, a display method of the above interactive LED display device is provided. FIG. 2 illustrates a preferred embodiment of the display method, which comprises the following steps:

Step 001, constructing a plurality of interactive sensors 104 and keeping interactive sensors 104 in an interactive detection status;

Step 002, transferring induction values to the interactive effective induction systems 103 by the interactive sensors 104;

Step 003, the interactive effective induction systems 103 determining whether the currently received induction values are interactive effective status or not, whilst the interactive effective induction systems 103 detect the induction values of the interactive sensors 104;

Step 004, providing corresponding output status by the interactive effective induction systems 103 depending on current status, if any output status of the interactive effective induction systems 103 is changed, the unit information acquisition systems 101 capture the changed output status and enter into acquisition interrupts;

Step 005, the unit information acquisition systems 101 acquiring the status of the interactive effective induction systems 103 and storing data in their own memories, then waiting for communication interrupt emitted from the control terminal 100;

Step 006, the control terminal 100 reading interactive effective data of LED display screens from all the unit information acquisition systems 101; and Step 007, the control terminal 100 controlling displaying of scenes according to the interactive effective data.

Figure 3:
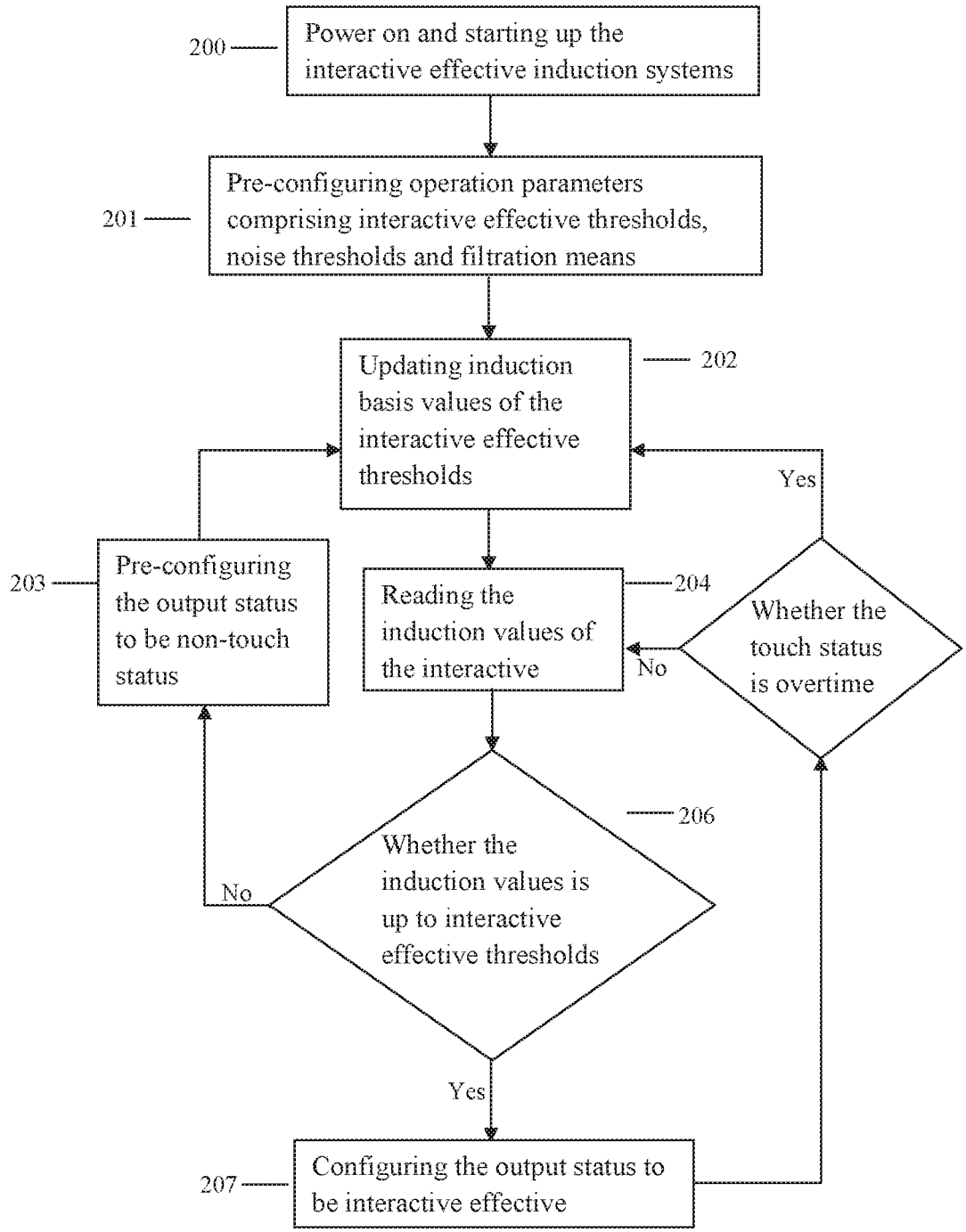
FIG. 3 illustrates an operation flow of an interactive effective induction system in the interactive LED display device according to the embodiment of the present invention.

As shown in FIG. 3, operation of the interactive effective induction systems 103 comprises the following steps:

Step 200, power on and starting up the interactive effective induction systems 103;

Step 201, the interactive effective induction systems 103 performing initialization according to predetermined programs and pre-configuring operation parameters comprising interactive effective thresholds (i.e., triggering thresholds), noise thresholds and filtration means;

Step 202, the interactive effective induction systems 103 updating induction basis values of the interactive effective thresholds according to induction values of the interactive sensors 104;

The induction basis value has a direction influence on every induction value detected and calculated by the interactive effective induction systems 103. Further, the induction basis value as a variant which is applied in the preferred embodiment contributes to enhancing adaptability of the induction systems in a serious circumstance. Specifically, the induction values of the interactive sensors 104 increase or decrease depending on change of external circumstance (e.g., increasing or decreasing in temperature and humidity, existence of non-interactive obstruction above the LED modules). In this situation, the induction values cannot be helpful for interactive effective induction systems 103 to exactly determine whether the status is in an interactive effective status or not. However, since the induction basis value is updated in real time depending on an induction value detected by the interactive effective induction systems 103 due to a non-interactive effective status, the interactive effective induction systems 103 can accurately determine and pick up the interactive effective status even though the induction values of the interactive sensors 104 (the same to human body's sensors) are changed.

Step 204, the interactive effective induction systems 103 detecting and reading the induction values of the interactive sensors 104;

Step 206, determining whether any interactive effective action is existed or not by comparing read induction values relative to interactive effective thresholds, if not (i.e., in case that the induction value is less than the interactive effective threshold), performing step 203 and then performing step 202 (i.e., keep on updating induction basis value according to induction value read in this time); if yes (i.e., in case that the induction value is more than the interactive effective threshold), performing step 207 (i.e., the interactive effective induction system 103 pre-configures the output status to be in an interactive effective status);

Step 203, pre-configuring the output status to be non-touch status;

Step 207, configuring the output status to be touch status and the interactive effective induction systems 103 starting up timers; and Step 205, determining whether the touch status is over-time or not, if not, back to step 204 (i.e., reading the current induction values of the interactive sensors 104 again); if yes, back to step 202 (i.e., updating induction basis value according to induction value read in last time).

Figure 4:
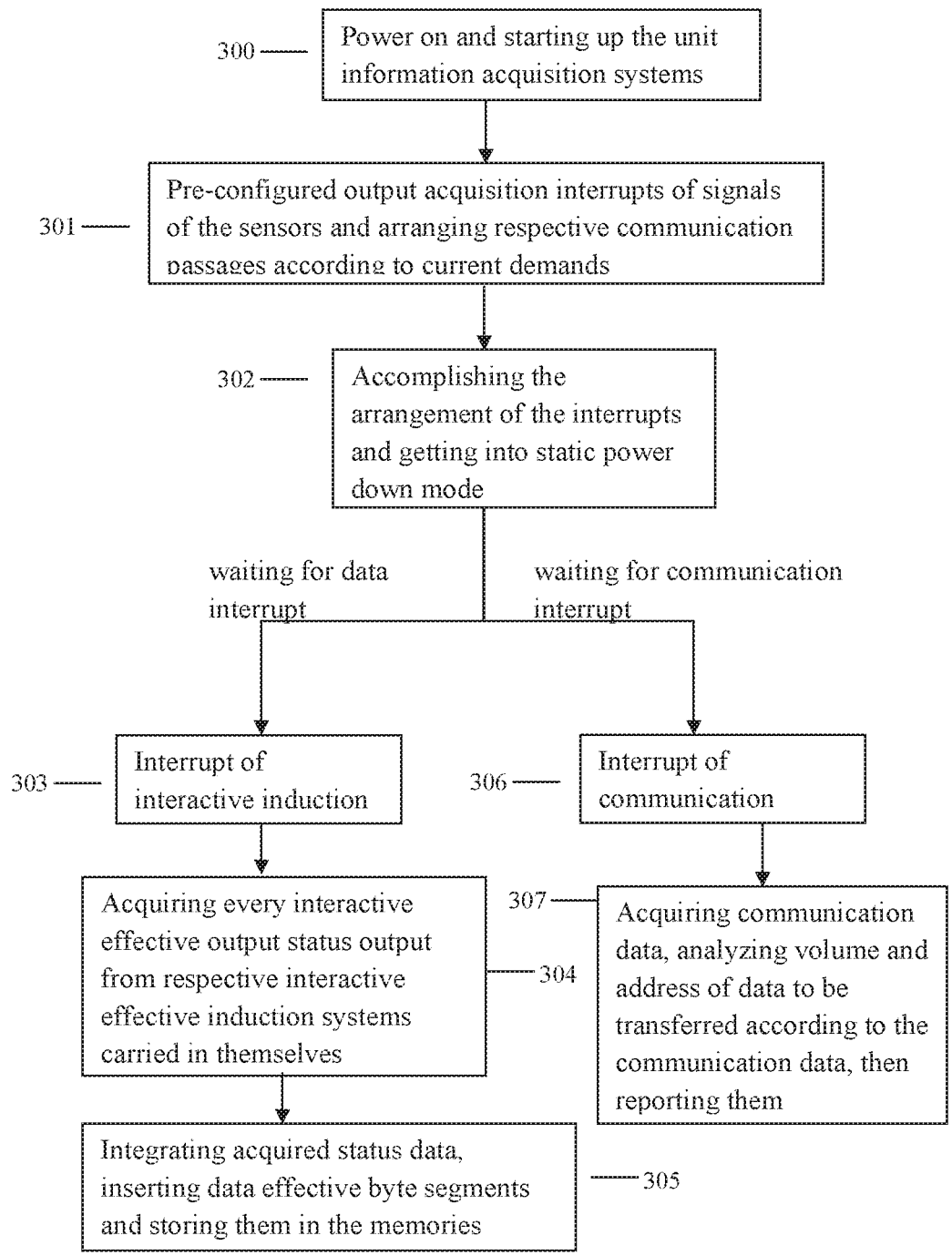
FIG. 4 illustrates an operation flow of a unit information acquisition system in the interactive LED display device according to the embodiment of the present invention.

Preferably, as shown in FIG. 4, operation of the unit information acquisition systems 101 comprises the following steps:

Step 300, power on the unit information acquisition systems 101 and operating the unit information acquisition systems 101;

Step 301, the unit information acquisition systems 101 performing initialization according to their own pre-configured programs and distributing output acquisition interrupts for the interactive effective induction systems 103 and arranging respective communication passages according to current demands;

Step 302, the unit information acquisition systems 101 getting into static power down mode and waiting for interrupt wake-up after accomplishing the arrangement of the interrupts;

Step 303, if any output status of the interactive effective induction systems 103 is changed, the unit information acquisition systems 101 capture the changed output status and trigger respective interrupts;

Step 304, the unit information acquisition systems 101 separately acquiring every interactive effective output status from respective interactive effective induction systems 103 carried in their own;

Step 305, the unit information acquisition systems 101 integrating acquired status data and stored in the memories, and then getting into static power down mode;

Step 306, if the control terminal 100 transmits communication request to the unit information acquisition systems 101, the unit information acquisition systems 101 get into communication interrupt; and Step 307, the unit information acquisition systems 101 reporting address data having interactive effective information to the control terminal 100 according to address information incorporated in communication data, if any other interrupt responses are not occurred after the report, the unit information acquisition systems 101 get into static power down mode and wait for next interrupt wake-up.

Figure 5:
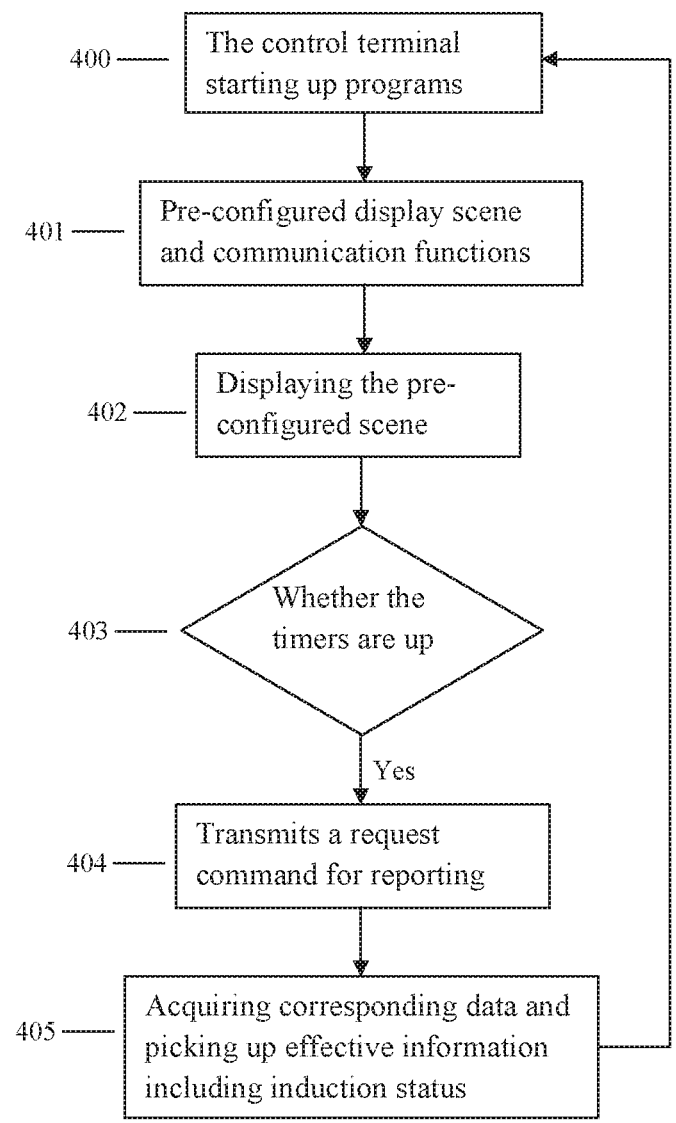
FIG. 5 illustrates an operation flow of a control terminal in the interactive LED display device according to the embodiment of the present invention.

Preferably, as shown in FIG. 5, operation of the control terminal 100 comprises the following steps:

Step 400, the control terminal 100 starts up programs;

Step 401, pre-configuring parameters with respect to communication and parameters with respect to display scene according to given programs, and arranging timers for transmitting communication requests;

Step 402, the desired display scene being transmitted to the LED modules 102 for displaying the desired scene. More preferably, the transmission of the desired display scene in step 402 is performed through the control terminal 100 to a transmitting card, then to LED units, finally to LED modules 102.

Step 403, waiting for that the timers for transmitting communication requests are up;

Step 404, if one respective timer is up, the control terminal 100 transmits corresponding communication request and waits for receiving report data from corresponding unit information acquisition system; and Step 405, if the report data from the unit information acquisition system 101 is successfully received, the control terminal 100 analyses effective data and picks up data segments related to the interactive effective induction, changes or remains the scene parameters according to the date and preset control programs, and then back to step 402 to control displaying of the scene after accomplishing the arrangement of scene parameters.

An entire display control flow is implemented by the above steps, which are performed from the interactive sensors to the interactive effective induction systems, next to the unit information acquisition systems, then to the control terminal, finally back to the LED modules.

In the embodiment of the present invention, the induction basis value is updated in real time depending on an induction value detected by the interactive effective induction systems due to a non-interactive effective status. The interactive effective induction systems 103 can accurately determine and pick up the interactive effective status even though the induction values of the interactive sensors 104 (the same to human body's sensors) are changed. This eliminates undesirable influence (which is described in this background art) to interactive induction of the sensors due to variation of external circumstance. In the art, the sensing sensitivity of the sensors will be decreased when they are located in an external serious circumstance, such as for example, high temperature, high humidity or that surfaces of the display screens are interfered by something (e.g., dust, water or other obstruction attached on the surfaces of the interactive display). In these serious conditions, spurious triggering or failure triggering may be happened to the sensors, thereby producing a serious influence on interactive display quality and display effect.

The above are described as embodiments of the present invention, however, it is no way intended to limit the present invention to these embodiments. Any changes, equivalences and modifications within the spirit and scope of the present invention should be encompassed within the scope appended claims.

What is claimed is:

1. A display method of an interactive LED display device, wherein the interactive LED display device comprises a control terminal, a plurality of LED modules, a plurality of unit information acquisition systems, a plurality of interactive sensors and interactive effective induction systems, the control terminal being connected to the plurality of unit information acquisition systems, each unit information acquisition system being connected to the plurality of LED modules, each LED module being connected to the plurality of interactive effective induction systems, each interactive effective induction system being connected to at least one interactive sensor, wherein the interactive effective induction systems are configured to detect and read the induction values of the interactive sensors, the unit information acquisition systems are configured to acquire the status of the interactive effective induction systems, and the control terminal is configured to read interactive effective data of LED display screens from all the unit information acquisition systems and to transmit the desired display scene to the LED modules for displaying the desired scene;

wherein the display method comprising the following steps:

Step 001, constructing a plurality of interactive sensors;

Step 002, transferring induction values to the interactive effective induction systems by the interactive sensors, the interactive effective induction systems detecting and reading the induction values of the interactive sensors;

Step 003, the interactive effective induction systems determining whether the currently received induction values are interactive effective status or not;

Step 004, providing corresponding output status by the interactive effective induction systems;

Step 005, the unit information acquisition systems acquiring the status of the interactive effective induction systems and storing data in their own memories thereof;

Step 006, the control terminal reading interactive effective data of LED display screens from all the unit information acquisition systems; and Step 007, the control terminal transmitting the desired display scene to the LED modules and controlling displaying of scenes according to the interactive effective data, wherein operation of the interactive effective induction systems comprises the following steps:

Step 200, powering on and starting up the interactive effective induction systems;

Step 201, the interactive effective induction systems performing initialization according to predetermined programs and pre-configuring operation parameters comprising interactive effective thresholds, noise thresholds and filtration means;

Step 202, the interactive effective induction systems updating induction basis values of the interactive effective thresholds according to induction values of the interactive sensors;

Step 204, the interactive effective induction systems detecting and reading the induction values of the interactive sensors;

Step 206, determining whether any interactive effective action is existed or not by comparing read induction values relative to interactive effective thresholds, if not, performing step 203 and then performing step 202; if yes, performing step 207;

Step 203, pre-configuring the output status to be non-touch status;

Step 207, configuring the output status to be touch status and the interactive effective induction systems starting up timers; and Step 205, determining whether the touch status is overtime or not, if not, back to step 204; if yes, back to step 202.

2. The display method of claim 1, wherein the operation of the unit information acquisition systems comprises the following steps:

Step 300, powering on and starting up the unit information acquisition systems;

Step 301, the unit information acquisition systems performing initialization according to their own pre-configured programs and distributing output acquisition interrupts for the interactive effective induction systems and arranging respective communication passages according to current demands;

Step 302, the unit information acquisition systems getting into static power down mode and waiting for interrupt wake-up after accomplishing the arrangement of the interrupts;

Step 303, if any output status of the interactive effective induction systems is changed, the unit information acquisition systems capturing the changed output status and triggering respective interrupts;

Step 304, the unit information acquisition systems separately acquiring every interactive effective output status from respective interactive effective induction systems carried in them;

Step 305, the unit information acquisition systems integrating acquired status data and stored in the memories, and then getting into static power down mode;

Step 306, if the control terminal transmits communication request to the unit information acquisition systems, the unit information acquisition systems getting into communication interrupt; and Step 307, the unit information acquisition systems reporting address data having interactive effective information to the control terminal according to address information incorporated in communication data, if any other interrupt responses are not occurred after the report, the unit information acquisition systems get into static power down mode and wait for next interrupt wake-up.

3. The display method of claim 1, wherein the operation of the control terminal comprises the following steps:

Step 400, the control terminal starting up programs;

Step 401, pre-configuring parameters with respect to communication and parameters with respect to display scene according to given programs, and arranging timers for transmitting communication requests;

Step 402, the desired display scene being transmitted to the LED modules for displaying the desired scene;

Step 403, waiting for that the timers for transmitting communication requests are up;

Step 404, if one respective timer is up, the control terminal transmitting corresponding communication request and waiting for receiving data reported from corresponding unit information acquisition system; and Step 405, if the report data from the unit information acquisition system is successfully received, the control terminal analyzing effective data and picking up data segments related to the interactive effective induction, changing or remaining the scene parameters according to the data and preset control programs, and then back to step 402 to control displaying of the scene after accomplishing the arrangement of scene parameters.

4. The display method of claim 1, wherein the transmission of the desired display scene in step 402 is performed through the control terminal to a transmitting card, then to LED units, finally to LED modules.

5. The display method of claim 1, wherein the interactive effective induction systems are connected to one or more interactive sensors.

6. The display method of claim 5, wherein the interactive sensors are physical sensors which are selected from the group consisting of: weight sensors and capacitance sensors.

7. The display method of claim 5, wherein the unit information acquisition systems, the LED modules, the interactive sensors and the interactive effective induction systems are in conformance with a preset proportion therebetween, the number of the interactive effective induction systems being in proportion to the number of the interactive sensors, the number of the unit information acquisition systems being in proportion to the number of the LED modules, the LED modules being configured to be a plurality of LED display units, all the LED display units constructing a main LED display screen, for displaying a continuous and motion main scene.

8. The display method of claim 7, wherein each LED display unit is equipped with one or more interactive sensors and each interactive sensor is separately connected to one or more interactive effective induction systems.

9. The display method of claim 7, wherein each LED display unit is equipped with a display screen and all the display screens are matched together with one another to form the main LED display screen, the display screens being arranged in an array form, each LED display screen being equipped with one or more interactive sensors.

10. The display method of claim 7, wherein each LED display unit is connected to the control terminal so that the control terminal is able to control the displaying operation of every LED display unit depending on data acquired by the unit information acquisition systems, each LED display unit separately showing its own divided scene in respective LED display screen, the control terminal distributing all the divided scenes to the LED display units and controlling the LED display units to display according to preset or given distribution of the divided scenes.

11. The display method of claim 1, wherein the control terminal is a computer.

12. The display method of claim 1, wherein the unit information acquisition systems are micro controller units.

13. The display method of claim 1, wherein a plurality of timers is provided to be cooperative with transmittance of communication requests, if one respective timer is up, the control terminal transmits corresponding communication request and waits for receiving report data from corresponding unit information acquisition system.

14. The display method of claim 1, wherein each display screen comprises a display panel which is provided with one or more interactive induction films attached to the display panel.

15. The display method of claim 14, wherein the interactive induction films are configured to actively and immediately monitor their own stress at any time and to generate a pressure variation when they are pressed from outer force.

16. The display method of claim 14, wherein the interactive induction films are copper films or copper foil.

17. The display method of claim 14, wherein each interactive sensor comprises a sensor IC which is connected with one respective interactive induction film.

18. The display method of claim 17, wherein the sensor IC is disposed on the interactive effective PCB board.

* * * * *